(12) United States Patent  
Adams (10) Patent No.: US 9,033,281 B1
(45) Date of Patent: May 19, 2015

(54) REMOTE CONTROLLED AERIAL RECONNAISSANCE VEHICLE

(76) Inventor: Richard D. Adams, Madison, AL (US)

(*) Notice: Subject to any disclaimer, the term of this patent is extended or adjusted under 35 U.S.C. 154(b) by 254 days.

(21) Appl. No.: 13/410,225

(22) Filed: Mar. 1, 2012

Related U.S. Application Data

(60) Provisional application No. 61/448,053, filed on Mar. 1, 2011.

(51) Int. Cl.
*B64D 9/00* (2006.01)

(52) U.S. Cl.
CPC .......................................... *B64D 9/00* (2013.01)

(58) Field of Classification Search
CPC .............. B64D 9/00; B64D 1/08; B64D 1/12; B64C 39/024
USPC ............. 244/3.1, 3.14, 147, 152, 138 R, 142, 244/137.1, 139, 145, 190
See application file for complete search history.

(56) References Cited

U.S. PATENT DOCUMENTS

| | | | |
|---|---|---|---|
| 2,721,716 A * | 10/1955 | Beadle | 244/142 |
| 8,263,919 B2 * | 9/2012 | Murphy et al. | 244/3.1 |
| 2004/0196367 A1 * | 10/2004 | Raymond et al. | 348/144 |
| 2012/0145833 A1 * | 6/2012 | McCann et al. | 244/151 A |

* cited by examiner

*Primary Examiner* — Valentina Xavier
(74) *Attorney, Agent, or Firm* — Mark Clodfelter (57) ABSTRACT

A radio controlled UAV is disclosed. The UAV includes a parachute, with a cylindrical power and control module suspended vertically below the parachute. In one embodiment, a propulsion source is mounted on top of the power and control module with control lines connected to the module below the propulsion source, and in another embodiment the power and control module is suspended from a point above a propulsion source. The UAV is controlled by radio controls from a hand held controller, with actuators retracting and letting out control lines attached to the parachute in order to control direction of the parachute. The UAV may be launched from a tube using a pressurized tank with a nozzle expelling gas from the tank, the tank and nozzle towing a canister from which the UAV is deployed.

19 Claims, 11 Drawing Sheets

REMOTE CONTROLLED AERIAL RECONNAISSANCE VEHICLE

CROSS REFERENCE TO RELATED APPLICATIONS

This application claims the benefit of provisional application No. 61/448,053, filed Mar. 1, 2011, and which is incorporated herein by reference in its entirety.

FIELD OF THE INVENTION

This invention relates generally to unmanned aerial vehicles (UAVs), and particularly to a small, relatively slow but powered aerial vehicle with a rapid deployment time, and which requires little or no training to use.

BACKGROUND OF THE INVENTION

A number of systems are in use today that employ parachutes for lowering objects and people to the ground. In the simplest systems, cargo or supplies are attached to a parachute, and simply pushed from an aircraft over an area where the supplies are needed. In more complicated such systems, the parachute may be guided, as by a GPS control system associated with the parachute, so that the parachute is directed to specific GPS coordinates. In these systems, control lines from the guidance system are pulled or released to deform a portion of the parachute, causing the parachute to change direction.

Also in the prior art are powered parachutes where a person is strapped into a harness attached to the parachute, with an engine having a propeller oriented on the person's back. The engine and propeller provide thrust, with direction and altitude controlled by the person manually operating control lines attached to the parachute.

U.S. Pat. No. 7,467,762 B1 (Parsons) teaches how to overcome weaknesses of rockets and parafoils by using weather cocking, and explains how his rocket launch system will seek a prevailing wind. He discusses overcoming this issue, along with the winds effect on the parafoil, by using the phenomenon of weather cocking to his advantage. This is by no means a new theory and has been known, if not by the same name, since man threw the first spear or shot the first arrow in a windy environment. To overcome this phenomenon, one angles the projectile, whatever it is, towards the wind knowing that the relative wind will move the projectile in the opposite direction.

Similar to Parsons initial test flights, one propulsion design of the instant invention for the original prototype had its solid-rocket motor at the rear of the rocket, as well as a set of guidance fins at the rear of the rocket. Also similar to Parson's experiments, the rocket was very unstable with the small protruding fins, so larger fins were installed to increase stability. Though stability was increased, payload weights, as well as the center of gravity and center of pressure of the thrust had to be closely monitored to prevent instability issues.

For small rocket systems, such as shoulder fired and mobile rocket systems, the disadvantage of larger fins required larger storage space within the launching tube, or the fins designed to be folded, either within a recess in the rocket itself, or against an exterior of the rocket. Such folding fins are typically spring-loaded so that they rapidly unfold and are locked in place after leaving a launch tube. Folding fins have their advantages, such as a larger design, but the disadvantages are more weight due to the folding mechanisms and larger fins, and more chances of mechanical failure during deployment. In some instances, folding fins occupy a significant amount of vertical space for storage, which increases the size of the launch vehicle and launching system.

In manned spacecraft, one or more solid fuel emergency escape rockets are mounted above a capsule containing one or more space travelers, the capsule being atop a multi-stage launch vehicle that lifts the capsule out of the Earth's gravity well. In the event of a catastrophic malfunction of the launch vehicle, the escape rocket is ignited near simultaneously with releasing the capsule from the launch vehicle, and the escape rocket quickly pulls the capsule away from the malfunctioning launch vehicle. After the escape rocket burns out, a parachute is deployed that safely lowers the capsule back to Earth. Since the escape rocket is mounted above the capsule, it should always seek an upward direction because gravity acting on the mass of the capsule pulls the capsule downward and drags the rocket and capsule into a vertical orientation. However, since this is an emergency escape rocket system, the G-forces are as extreme as a human being can stand, and no consideration is made with respect to damage to the capsule and associated components by such G-forces. Also, the parachute is unguided and unpowered, so the capsule and parachute cannot be directed to a landing zone.

In many combat and crime situations, it is desirable to have an "eye in the sky" for surveillance purposes. While hand-launched fixed and rotary wing UAVs have been developed that may be applied to this purpose, such UAVs have disadvantages. Initially, an operator must have at least some flight training. Also, in many instances, such small fixed wing UAVs require the operator to stand and throw the UAV in the manner of a glider, which may not be possible in some combat situations. Further, the UAV and associated equipment are bulky, approximately the size of a small suitcase at best, and may be difficult to carry into a combat situation. Further, it takes time to unpack the UAV from its case, assemble it as necessary and prepare it for flight. Also, such UAVs are relatively fast and cannot easily be maneuvered into cramped areas, require constant power to maintain flight and constant attention from a user in order to direct the UAV over a desired area.

In other instances, such as damaged nuclear power plants, chemical plants, train and vehicle wrecks involving hazardous materials and other similar situations, it is desirable to have a UAV equipped with a camera and video transmitter that can be flown into the hazardous area in order to access the situation. However, a small fixed wing UAV typically flies too fast to easily maneuver within a cramped area, and has a limited flight time. A rotary wing UAV can be maneuvered easily in cramped areas, but they also have limited flight times and require more power to fly slow or hover than to fly fast.

From the foregoing, it is apparent that there is a need for an inherently stable, relatively slow, small unmanned aerial vehicle system at least for reconnaissance, and which provides maneuverability of a powered fixed-wing craft and has a deployment time of a shoulder launched rocket.

DETAILED DESCRIPTION OF THE DRAWINGS

Figure 01:
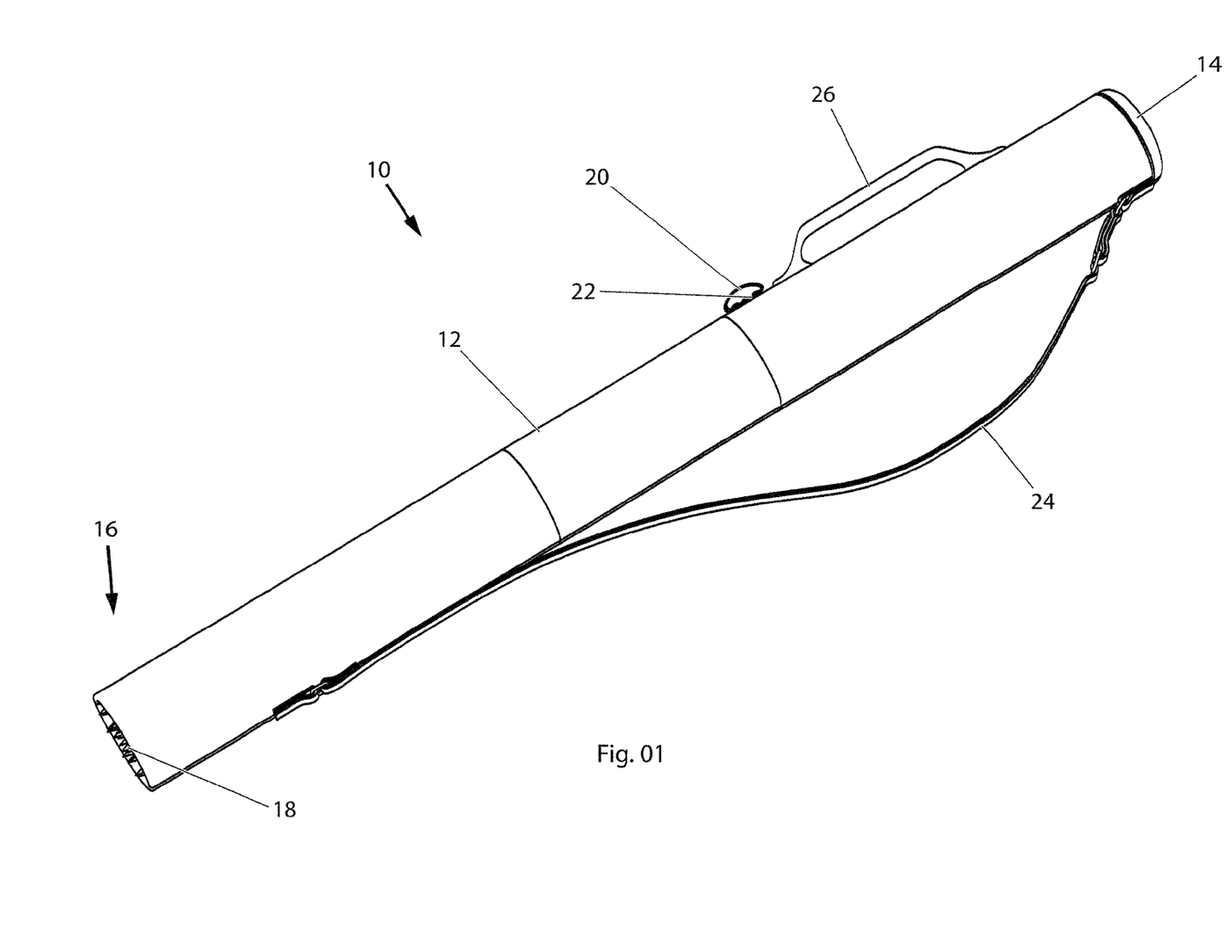
FIG. 1 is an illustration of a housing containing a UAV of the instant invention.

Referring initially to FIG. 1, a UAV launching system 10 of the instant invention is shown. A tubular carrying case or housing 12 holds and protects the UAV and components of the system during transport, and is sealed against dust, dirt and liquids. Housing 12 also serves as a launch tube for the UAV. A removable cap 14 is provided at an upper end of housing 12, and which is removed when the UAV is launched. In some embodiments, the cap may comprise the upper portion of housing 12 so that launch handle 20, which is attached to a projectile carrying the UAV, as will be explained, is exposed and not blocked by other portions of housing 12 during launch. Lower end 16 of housing 12 is provided with a surface 18, which may include one or more short spikes designed or configured to grip a ground surface, road or other surface during launching to prevent end 16 from slipping. In other embodiments, surface 18 may be configured to include rubberized knobby cleats or other spike-like arrangements, or be configured similar to an aggressive tire tread similar to a mud or snow tire for frictional engagement of the surface from which the parachute assembly is launched. Where launch handle 20 is used to launch the UAV, a shaft attached to the launch handle would be sealed by a grommet 22 or the like to prevent water, dirt and dust from entering housing 12.

The system may be easily carried by one person and handled by a strap 24 or handle 26. in some instances, handle 26 may be positioned further down on the body of housing 12 and held by a person during launch in order to stabilize housing 12. In these embodiments, the system is lightweight, ranging from 3-6 pounds or so, with the housing being about 3" to 4" or so in diameter, and from 20" up to about 40" or so in length, depending on length and configuration of the projectile inside the housing.

The UAV of the instant invention may be scaled in size for heavier loads. Such heavier systems may only use the UAV portion without the launch tube, such as where the UAV carries cargo and is dropped from an aircraft. Of course, where such cargo is carried, the parachute is sized correspondingly larger, depending on a desired rate of descent of the UAV. Such a UAV system carrying cargo may be guided by GPS to land at a precise location, or be guided to a location under radio control by a person on the ground using a controller, as will be further explained. In addition to supplies, a larger UAV of the instant invention that is dropped from an aircraft may include at least one anti-personnel device, such as a bomb, the bomb-carrying UAV being radio controlled by a person on the ground and be made to loiter above a combat theater until needed, and then directed into a hostile entrenchment where the UAV and bomb are exploded, or the bomb dropped from the UAV. This would be particularly advantageous for troops on the ground, who, when under fire, may not always be able to give precise fire control coordinates for artillery or airstrikes. This embodiment of the instant invention would allow a high-flying aircraft to deploy the bomb-carrying UAV, with troops under fire using a controller to view the ground from a camera on the UAV in order to direct the UAV to a relatively low altitude directly over the target in order to drop the bomb, or fly a UAV carrying the bomb directly into a target. Cameras fitted to the UAV may be night vision cameras or any other camera particularly suited for the task at hand. The slow speed of the UAV, which may be from about 5 MPH up to about 25 MPH or so, allows for precise targeting and control. Where the UAV is powered electrically, it would produce almost no noise to warn those on the ground of its approach. In some instances, after a bomb or other cargo is dropped from the UAV, the UAV may be returned for refurbishing, rearming and reuse. In some embodiments, the UAV may be fitted with a fully autonomous auotopilot for directing the UAV to a selected location, as determined by GPS, and circle such location or perform other tasks. In addition, the autopilot may be switched "off" in order to allow control by a hand held radio controller.

Figure 02:
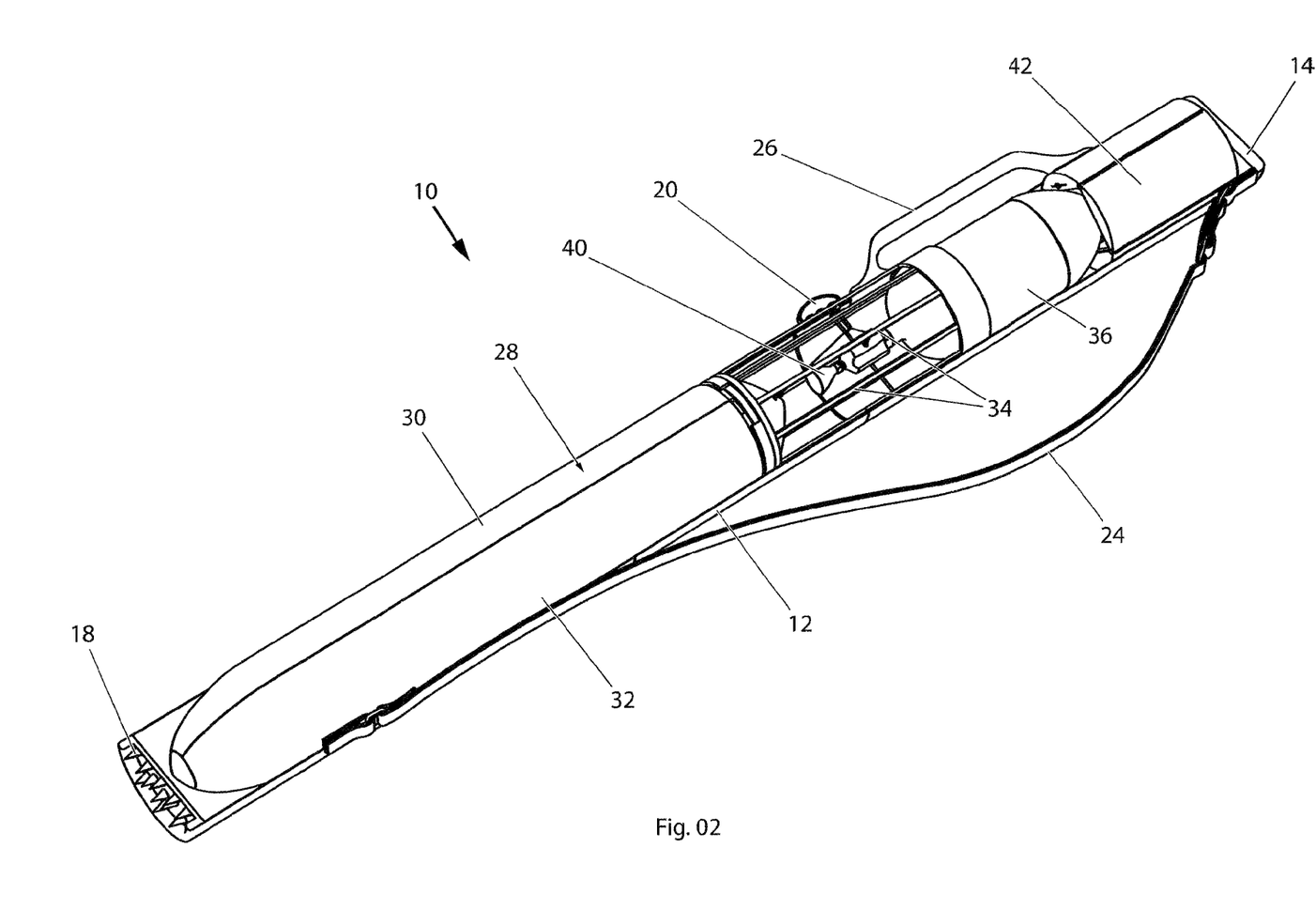
FIG. 2 is an illustration of the housing of FIG. 1 shown broken away and disposition therein of a projectile containing a UAV.
Figure 03:
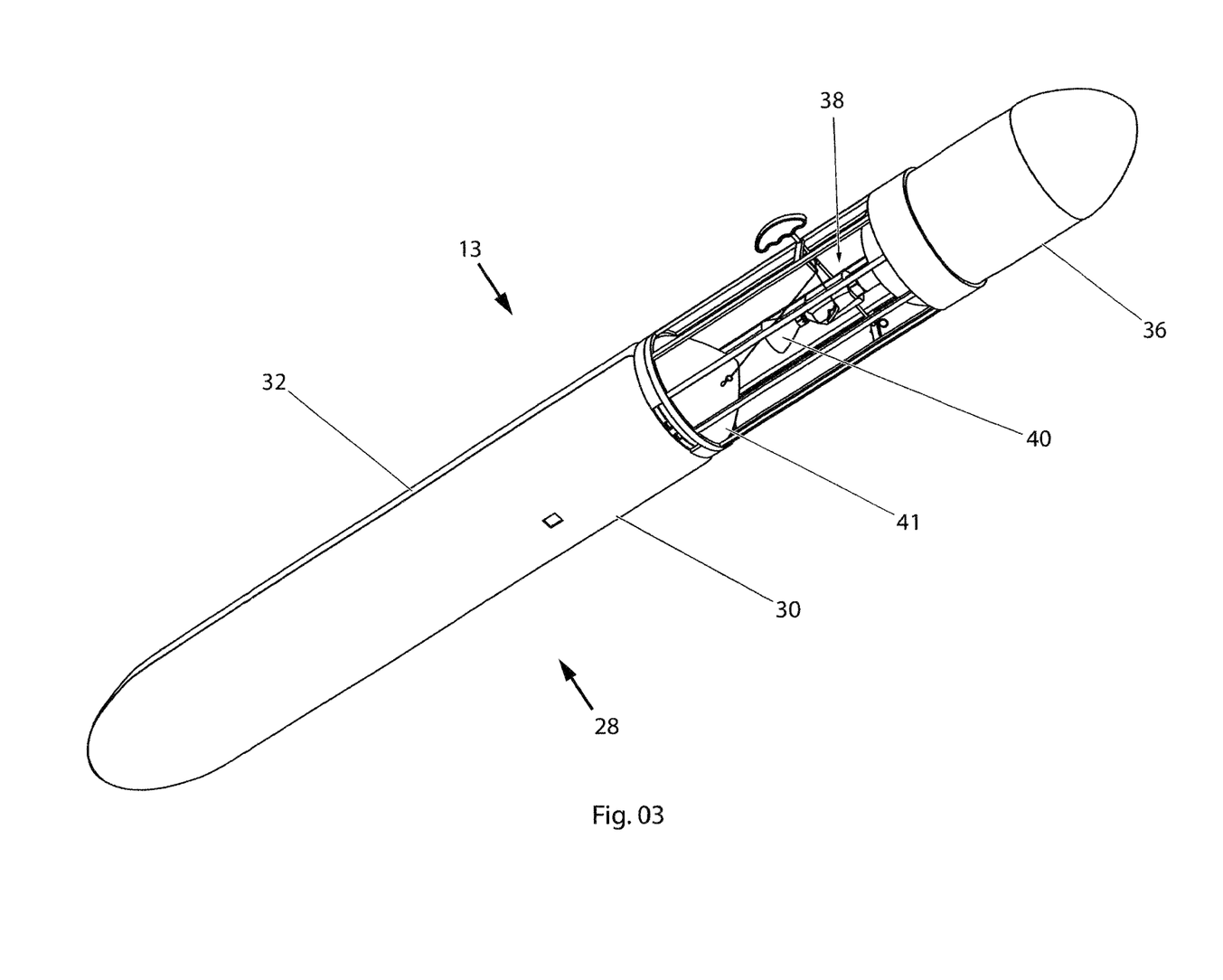
FIG. 3 is an illustration of a projectile of the instant invention that deploys the UAV of the instant invention.

FIGS. 2 and 3 illustrate a small system 10 that is lightweight as described above, and intended primarily for surveillance, with housing 12 broken away (FIG. 2) to show the relationship between the interior components and housing 12. As shown in FIG. 3, the launch assembly is generally configured as a projectile 13. Here, the UAV, which may be a guided parachute and at least a power and control module, as will be further explained, is packed and compactly stored in a canister 28 that is constructed having canister halves 30 and 32. After being launched, and at deployment altitude, which is at least a distance sufficient for the parachute to open, which may be about 50 feet or so, up to 200 feet to 300 feet or so, canister halves 30 and 32 separate and release the UAV within. Canister 28 is connected via a cage 34 to a gas pressure tank 36, which may be pressurized to a high pressure with air, nitrogen, or any other suitable propulsion gas. Here, while air is typically used, a heavier gas, such as carbon dioxide or an even heavier gas, such as a non-polluting Freon-type compound that stays in a gaseous state when pressurized, may be used in order to obtain increased reaction force when released. In other embodiments, a liquefied gas may be used, with a tube (not shown) within tank 36 extending from a nozzle 40 upward to near a top of tank 36 so that when launched, only gas from the boiling liquid gas is expelled.

Tank 36 may be of a composite construction that may include strong fibers such as para-aramid synthetic fibers wrapped around a plastic container, with epoxy binding the fibers to the plastic. In some instances, there may be a plurality of layers of plastic disposed between layers of fibers. In other embodiments, a relatively thin metal bottle may be wrapped and encased in combinations of layers of plastic, fibers and epoxy. Such a composite construction provides a tank that is strong and lightweight, and may be pressurized with propulsion gas up to about 5000 PSI or so, depending on the desired deployment altitude of the UAV. In other embodiments, tank 36 may be constructed of a suitable metal, such as a suitable aluminum or other metal alloy.

The gas within tank 36 is provided to a nozzle 40 via a valve 38 (FIG. 3), nozzle 40 configured generally as a rocket nozzle. Valve 38 is a high pressure valve that directly receives high pressure gas from tank 36. In some embodiments, valve 38 is opened to release gas to nozzle 40 by manually and quickly turning handle 20 (FIG. 2), and in other embodiments may be configured to operated electrically, as by a solenoid or the like, when a "launch" command is received. In these embodiments, handle 20 may be omitted, or only provided as a backup way to launch projectile 13. Size of an orifice in nozzle 40 or valve 38 determines a rate of escape of the gas in tank 36. As such, a smaller orifice provides less acceleration, slower climb rate and less stress to the UAV and associated components, while a larger orifice provides more acceleration and faster climb rate, but more stress to the UAV and associated components.

In another embodiment, rather than a pressurized gas tank 36 that must be pressurized in advance and maintain its pressurization, a gas generator may be mounted within tank 36 and used to pressurize the tank when the projectile is launched. Here, a charge similar to those used to inflate airbags, and which rapidly produces large amounts of gas when ignited, may be used to almost instantly pressurize tank 36 and launch projectile 13 to deployment altitude. In these embodiments, valve 38 may be omitted, with nozzle 40 and its orifice connected directly to tank 36. Significantly, since a burn rate of substances used to inflate airbags can be controlled with a high degree of precision, a gas generator for pressurizing tank 36 can be used that is sufficiently fast to quickly pressurize tank 36 to the required pressure, but slow enough so that a pressure or shock wave that otherwise might rupture tank 36 is avoided. Such burn rates for a gas generator may be between 50 milliseconds up to 1 second or so. The gas generator would be electrically ignited using an existing battery source in projectile 13 by a radio signal from a hand held controller, or by a manually operated switch.

In some embodiments, and as shown, the gas expelled from nozzle 40 may be directed along an axis of the projectile and against a conical shield 41, while in other embodiments a plurality, such as two or more smaller nozzles with correspondingly smaller orifices, may be angled slightly outward and in opposition to each other to balance and vector the thrust from the nozzles downward and outward from the axis of the projectile, preventing the expelled gasses from impinging on shield 41. This latter embodiment may provide a higher deployment altitude by eliminating reaction forces from the gas against shield 41. In other embodiments, tank 36 and associated nozzle 40 may simply be connected to a canister 28 by a cord or strap of 1-3 feet or so in length, and which may have some elasticity to avoid over-stressing a UAV or other cargo inside the canister upon launch, so that the canister is towed a distance behind the tank and nozzle assembly and not directly exposed to the exhaust gas from the nozzle during flight.

While pressurized gas propulsion is disclosed, it should be apparent that a small rocket motor using solid rocket fuel may also be used in place of tank 36, valve 38 and nozzle 40. Such an embodiment may be useful in non-combat situations where visibility of a smoke trail and heat signature of a rocket are not a concern. Also removably installed in housing 12 is a handheld controller 42 (FIG. 2) used to control and operate the UAV, as will be further explained. In operation, cap 14 is removed from housing 12 prior to launching the UAV, allowing controller 42 to be removed from the opened housing, or controller 42 may be removably mounted in cap 14 and removed therefrom after cap 14 is removed. In any case, controller 42 is removed and activated, and end 16 with gripping features 18 of housing 12 is placed against a ground or other surface and aimed generally upward and away from any overhead obstacles. The tube is braced or held, or in some instances held by handle 26 (FIG. 1) and launch handle or knob 20 rotated, releasing gas from tank 36 to nozzle 40 through valve 38 to propel projectile 13 upward to the deployment altitude. In most instances, the UAV can be deployed in well under 30 seconds or so. In other embodiments, knob 20 may be attached to a shaft that extends through valve 38 and through both sides of housing 12, and which functions as a safety pin. In this case, the pin would be pulled completely out of the valve and housing in order to launch the projectile and initiate gas flow to the nozzle. In any case, when the deployment altitude is reached, canister halves 30 and 32 separate to release the UAV. As noted, other embodiments may electrically operate valve 38 by a radio command from the handheld controller to launch projectile 13. Significantly, and as noted, since in some embodiments a cold, pressurized gas is expelled from nozzle 40 to produce lifting thrust, there is no heat signature or smoke trail to be detected, although in other embodiments, also as noted, a low G rocket, such as a solid fuel rocket, may be employed for providing thrust to lift projectile 13 to deployment altitude. In yet other embodiments that are hardened against G forces, compressed gas or a relatively low power powder charge, such as a gunpowder firework charge or a charge similar to an airbag inflator, may be ignited within tube 12 below projectile 13 so that the projectile is fired upward to deployment altitude in the manner of a mortar. In this instance, tube 12 would be of reinforced constructed to withstand such use. In a variation of this embodiment, a projectile of the instant invention may be fired as described from a tube 12 part of the way to deployment altitude, with a gas or rocket motor carrying the projectile the remaining distance to deployment altitude.

Figure 04:
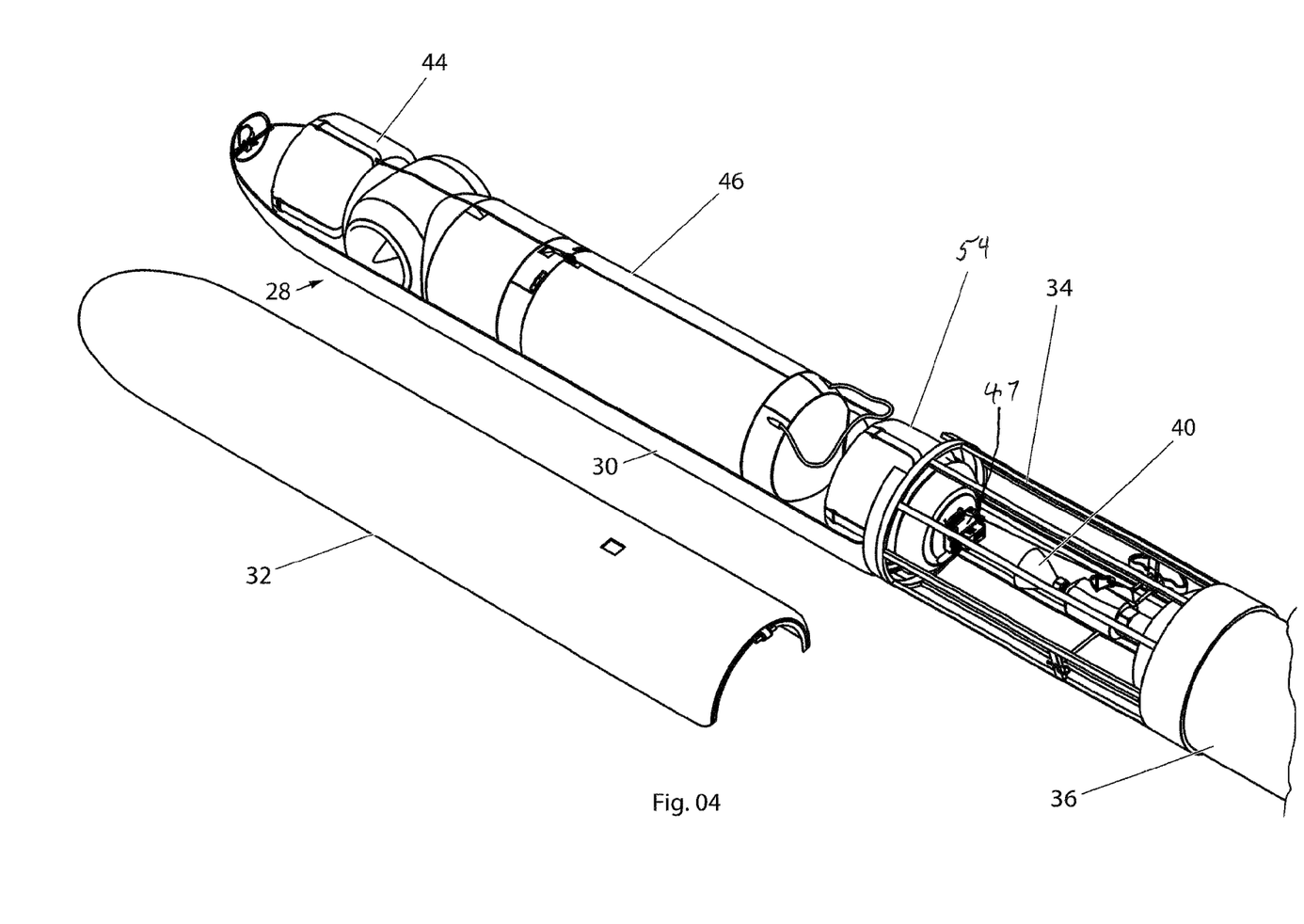
FIG. 4 illustrates a canister portion with a cover thereof removed to show packing of the UAV of the instant invention within.

FIG. 3 is a perspective view of projectile 13 comprising gas tank 36, cage 34 and canister 28 in its pre-launch configuration, with FIG. 4 showing an upper cover 32 of the canister 28 removed for clarity. While any type of cargo can be carried by canister 28 within its weight and size limits for delivery to deployment altitude, for purposes of the instant invention, it is contemplated that the payload be a small UAV comprising at least a small parachute 44, shown in a packed state, and which may be a parafoil parachute or a ram air parachute, the parachute supporting a power and control module 46 for powering the parafoil and performing at least one other function, such as surveillance. One such parachute that works well for 2 to 3 pound power and control modules 46 is a parafoil ram air parachute about 22 inches deep and about 80 inches across, and which provides excellent glide and maneuverability characteristics.

Figure 05:
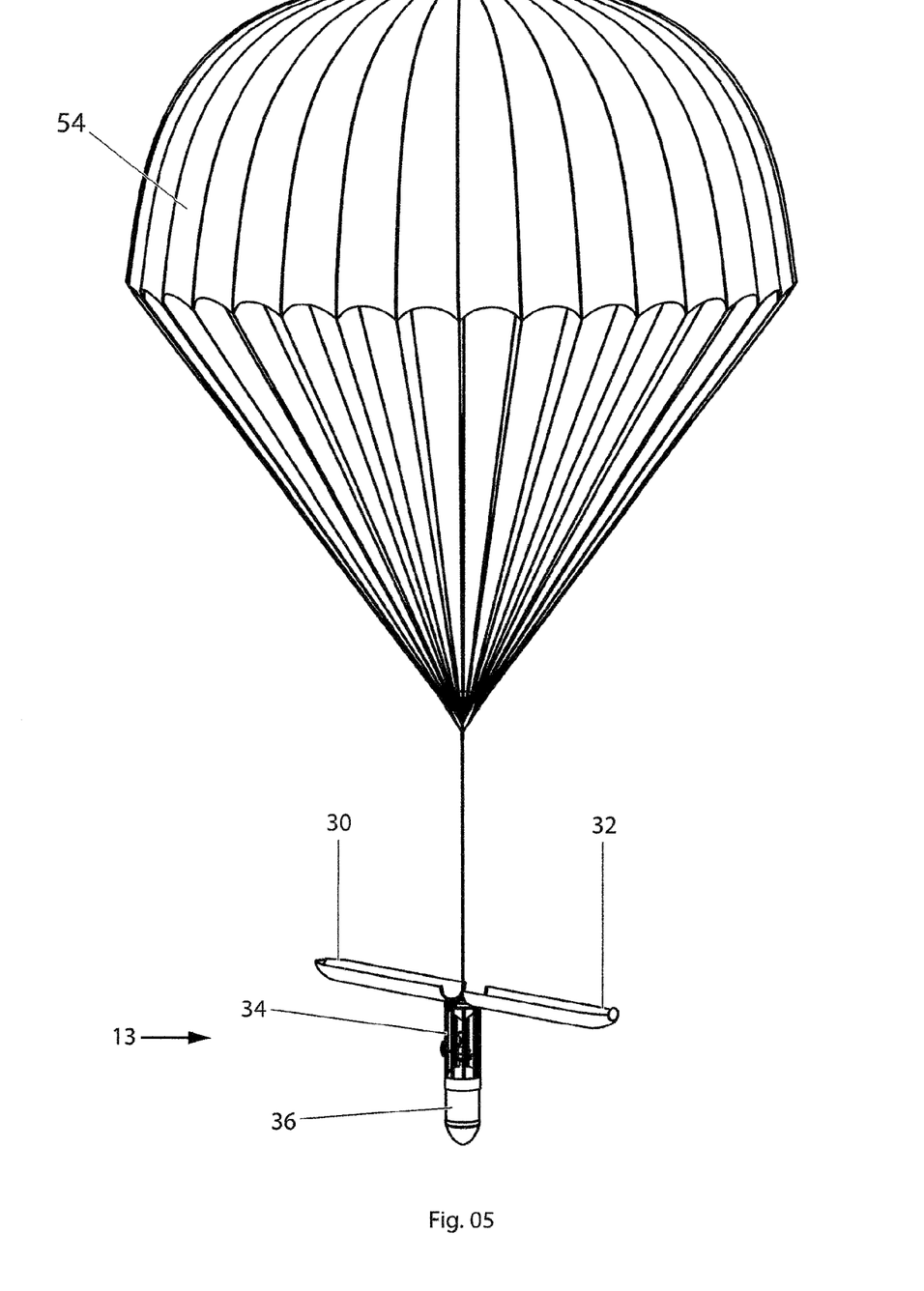
FIG. 5 is illustration of the projectile of the instant invention after deployment of a UAV of the instant invention.

Parafoil 44 and power and control module 46 are held by canister halves 30, 32, which are spring loaded and hinged on opposed sides of one end 48 of cage 34. This allows both halves 30, 32 to spring open to a position generally perpendicular to cage 34, as shown in FIG. 5, when a payload cover latch electrically operated by a solenoid or servo mechanism is energized. This action releases the UAV from inside canister 28. Here, the parachute is pulled away form canister halves 30, 32, as by a small drogue device, such as a small parachute or streamer (not shown) attached to parachute 44 in order to pull it away from the canister halves when opened, or in other instances a releasable line may be attached between one of canister halves 30, 32 and parachute 44 in order to pull the parachute out and away from the canister halves when they spring apart. In any case, parachute 44 would be packed within canister 28 in a manner so that the parachute inflates when the canister halves spring apart and release parachute 44. Projectile 13 simply falls away after the parachute begins to inflate.

Activation of the payload cover servo or solenoid that releases canister halves 30, 32 to spring apart is accomplished by a payload control system module 47. This module may comprise a battery operated microcontroller system including a payload deployment timer that, as noted, activates the payload cover servo or solenoid, in turn operating a catch that functions to release canister halves 30 and 32, allowing them to spring open and release the UAV. The timer counts down through a time delay, which may be 5 seconds to 10 seconds or so, corresponding to the time it takes for projectile 13 to reach deployment altitude. Here, the timer is started when projectile 13 is launched, as by a switch (not shown) operated by launching the projectile. Such a switch may be operated by activation of valve 38 that releases high pressure gas to nozzle 40, as shown by line 39 in FIG. 3 that would be attached to a timer switch, or may be a section of Mylar tape attached to an interior of housing 12 at one end and positioned between spring-loaded contacts for starting the timer at the other end. Here, when the projectile is launched, the tape is pull from between the contacts and the timer is started. Another switching mechanism may be a pressure switch mounted to the projectile that is open as long as the projectile is within tube 12, and is closed to energize the timer circuit when the projectile clears tube 12. This same switch for the timer circuit may also be used to activate a camera and other sensors associated with the UAV, and the radio control system aboard the UAV.

Components nearest nozzle 40 are protected by a conical protective cover 41 (FIG. 3), which protects such components from the air (or rocket) blast developed from nozzle 40. The cone portion of cover 41 is configured so as to vector gas from nozzle 40 around a respective end of canister 32, reducing reaction forces of the gas impinging on cover 41.

In some embodiments, after parafoil 44 and power and control module 46 are released at deployment altitude, a recovery parachute 54 (FIG. 5) may be deployed to safely lower projectile 13 to earth without damage to the projectile or persons and property, and possibly so that projectile 13 may be retrieved and reused. Release of this second parachute 54 may be accomplished by the same timer that counts down the delay that releases parachute 44, and which may continue to count down a second delay, such as 2 seconds or so, or initiate a second time delay for deployment of parachute 54. In other embodiments where projectile 13 is only to be used once in a combat zone, parachute 54 may be omitted and the projectile portion allowed to simply fall to earth in order to reduce the possibility of alerting hostile forces that a UAV has been launched.

The unique cold-gas launch and delivery system that launches projectile 13 allows a UAV to be launched to its operational altitude in unique and hazardous environments without the possibility of accidentally launching the projectile and/or payload where it is not needed. The projectile, with its cold-gas launch nozzle located on gas tank 36 and above payload canister 28, as shown in FIG. 3, is caused to seek a flight path that is generally vertical, or straight up, due to the mass of the payload serving as a ballast or pendulum to constantly maintain a generally vertical orientation of the projectile. In other words, even if fired at an angle, the weight of the payload will swing the powered projectile to a vertical orientation, causing it to travel upward and deploy the UAV generally directly overhead. As noted, and in some embodiments, the cold gas system provides a low-G delivery of the payload, with minimal or no heat signature and no smoke trail from burning fuel when compared to solid rocket delivery systems. Once projectile 13 reaches its apogee, as determined by the system timer, the UAV 55 (FIG. 6) is released and deployed.

Figure 06:
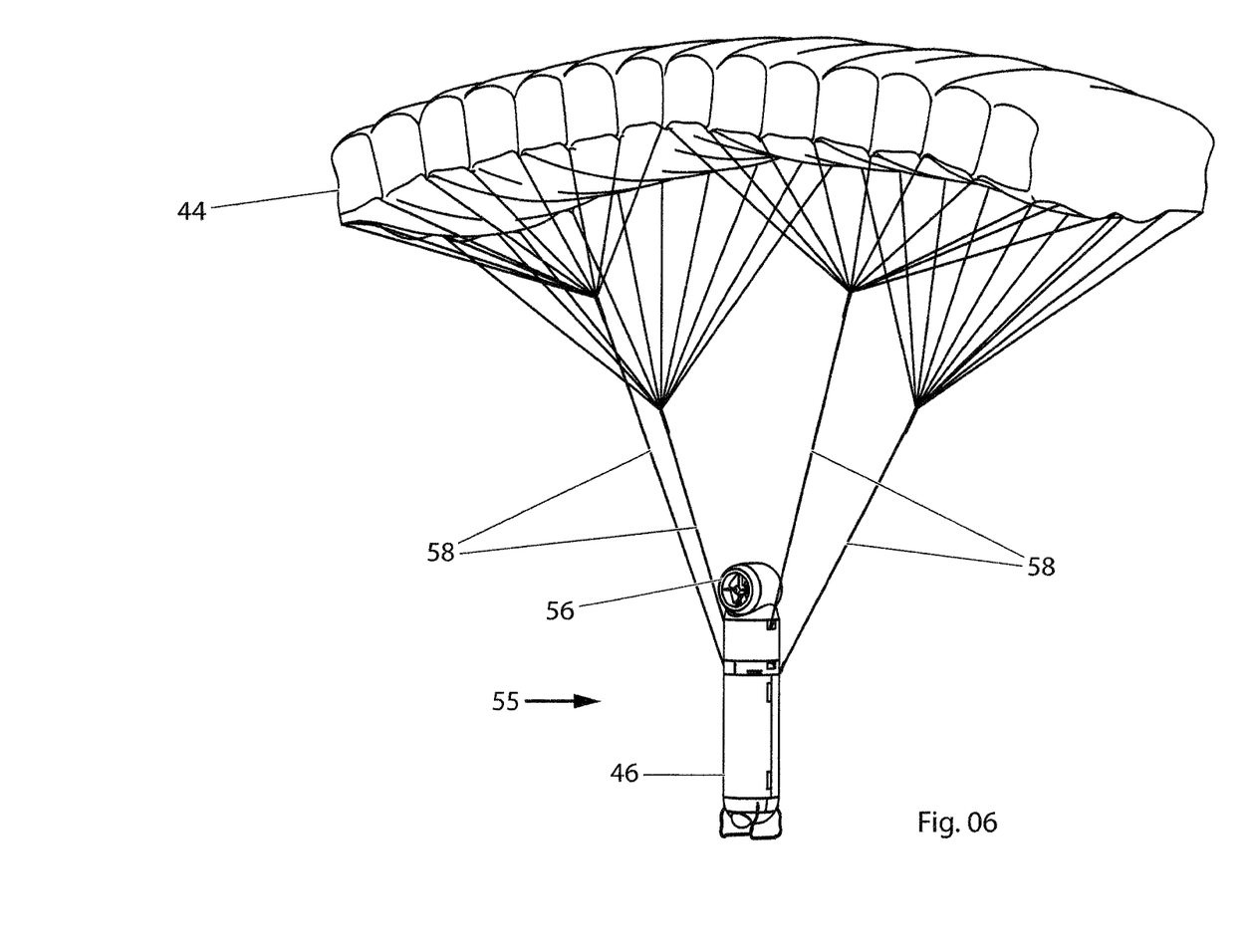
FIG. 6 is an illustration of a deployed UAV of the instant invention.
FIG. 6a is an illustration showing certain construction details related to a ducted fan of the instant invention.

As noted, and in some embodiments, UAV 55 may comprise a rectangular or elliptical parafoil or ram air parachute 44, which is more maneuverable than other types of parachutes. While a specific type of parachute is disclosed, it should be apparent that other types of parachutes may also be used. In military applications, parafoil 44 may be constructed of a durable sheet material that is also transparent or translucent, such as nylon, a thin, transparent durable sheet material such as uncoated Mylar, or other similar materials. In addition, power and control module 46 can also be of a light color to match the sky for further camouflage. Since power and control module 46 is oriented vertically under parachute 44, and is only 3" or 4" in diameter, and under a parachute generally overhead, the UAV presents a low visual profile, which make the UAV difficult to see. Significantly, in one embodiment, module 46 is suspended vertically from points near a top of module 46, and slightly below a ducted fan motor 56, which is mounted to module 46 at a point closest to the opened parachute. This lowers a center of gravity of the UAV and causes it to be inherently stable, and places thrust from the ducted fan above a point from which module 46 is suspended. Also, control problems are reduced by locating the ducted fan above a point where control lines 56 are attached. This construction reduces a tendency of the module 46 to swing like a pendulum, and stabilizes the control module underneath the parachute when powered.

As shown in FIG. 6, once deployed, a ducted fan 56 is used for propulsion, with a battery for powering the fan located within module 46. Control lines 58 are used to control flight of the parachute/payload combination, and are operated by one or more servo motors, stepper motors or the like, also powered by the battery in module 46. While four control lines are. shown suspending the control module, which would require at least two stepper or servo motors to operate, it is contemplated that two control lines would be used for directional control of a small surveillance UAV 55. Four control lines may be needed with a larger and heavier UAV as described above, but require more complex electronic packages and pose a greater risk for malfunction when deployed. A UAV having a controllable canopy, along with an electric ducted-fan motor gives the parafoil UAV excellent maneuverability and long loiter time over a selected area. For combat embodiments used for reconnaissance purposes, a UAV of the instant invention may only need to stay aloft for 10-15 minutes or so in order to assess a situation, obtain fire control coordinates, establish and transmit messages, engage hostile personnel and the like. Such an embodiment can thus carry a smaller battery for powering the ducted fan and associated electronics, and thus carry more payload. In other instances, where only a video camera and possibly other sensors are carried, such as where the UAV is used in border surveillance or surveying damage in hazardous areas, a larger battery may be provided, and which extends time aloft up to an hour or two. This longer loiter time is due to the large area of the parachute, which at 22 inches by 80 inches is 1760 square inches of area for a 3 pound power and control module. This is approximately 36.6 square inches of parachute per ounce of control module. This means that the ducted fan used for propulsion or to gain altitude only needs to be operated intermittently, as opposed to a fixed or rotary wing UAV where the propulsion motor must operate constantly in order for the UAV to stay aloft. In addition, the UAV can be precisely directed to a selected location for landing or engagement with a target. Further, a parafoil UAV is inexpensive, and easy to fly, requiring little or no special training to operate using the associated controls, as will be further explained.

The pendulum effect of the power and control module on the parafoil, which has a low center of gravity due to suspension of module 46 at points just below fan 56, along with the ducted fan propulsion system, makes this system ideal for windy and rough environmental condition flying and for surveillance and reconnaissance purposes. Typically, the small surveillance UAV of the instant invention with a parafoil or ram air parachute sized about 22 inches by about 80 inches, and having a power and control module weighing about 3 pounds or so, can reach a speed of about 25 miles per hour when powered.

Figure 6A:
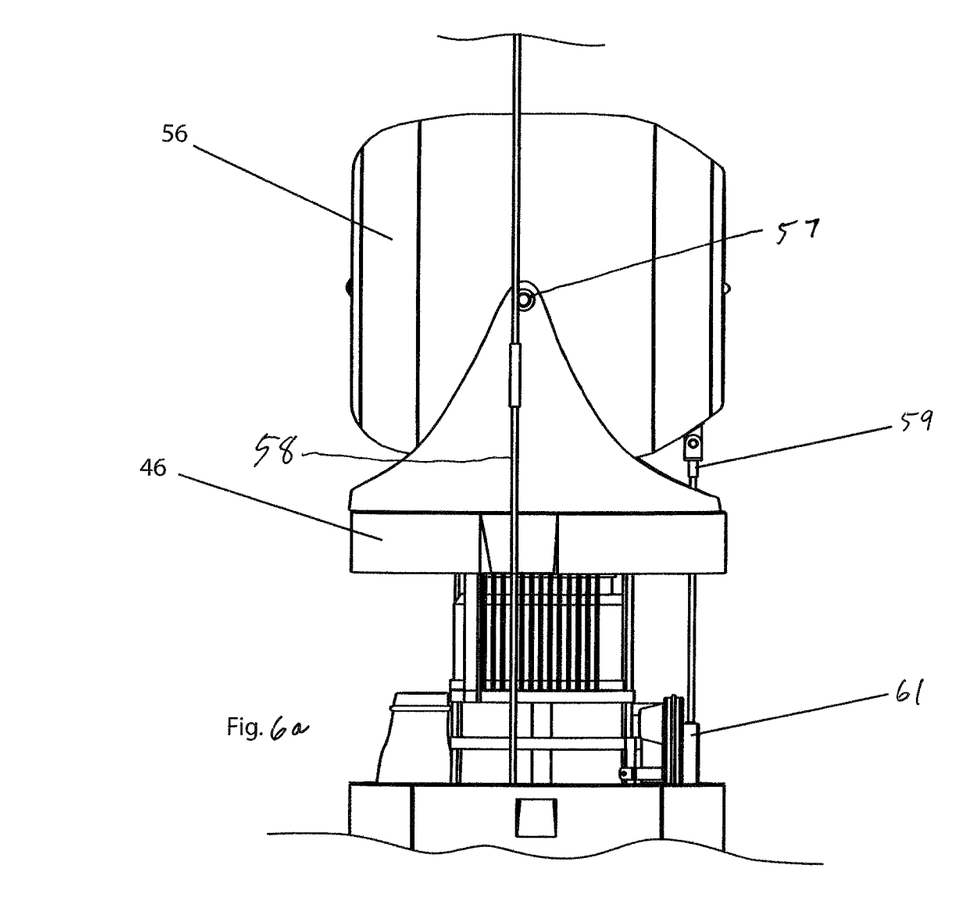

In some embodiments, and as shown in FIG. 6a, the ducted fan 56 may be mounted for pivoting about pins or shafts 57 in upward and downward directions so as to tilt fan 56 upward or downward. A linkage 59 would be connected at one end to fan 56, with the other end connected to an actuator 61 for tilting fan 56 upward or downward. In other instances, fan 56 may be mounted in a gimbal, on an arc-shaped track, swivel or the like so that the fan can be tilted in vertical directions by an actuator 59. This construction allows a user to cause the UAV to stay at a constant altitude when under power. Here, when the ducted fan is energized and pointed straight ahead, thrust produced by the fan pushes the power and control module forward and lifts the leading edge of the parachute upward, causing the UAV to gain altitude. In addition, and as noted, forward motion of a parafoil or ram air parachute causes it to create lift, which also causes the UAV to gain altitude. These tendencies for the UAV to gain altitude can be counteracted by tilting the fan downward when under power so that thrust developed by the fan is directed angularly upward. This increases speed of the UAV while keeping it at a selected altitude. Along with or instead of using a video camera, other sensors can be installed in the UAV, depending on the mission requirements. For instance, air quality sensors can be installed in a UAV of the instant invention for relatively long loiter time for monitoring for hazardous gas, chemical biological agents or radiation. Here, where nuclear reactors are damaged, as by earthquakes, a UAV of the instant invention equipped with radiation and video sensors can be flown into the damaged reactor and damage assessments obtained. For military operations, and as noted, a UAV of the instant invention can be equipped with offensive weapons, as well as used for target acquisition. Yet another use is to equip the power and control module with a communications relay so that personnel on the ground may use short-range communications devices to communicate with the relay, which provides a longer range link to a remote command post or the like.

Figure 07:
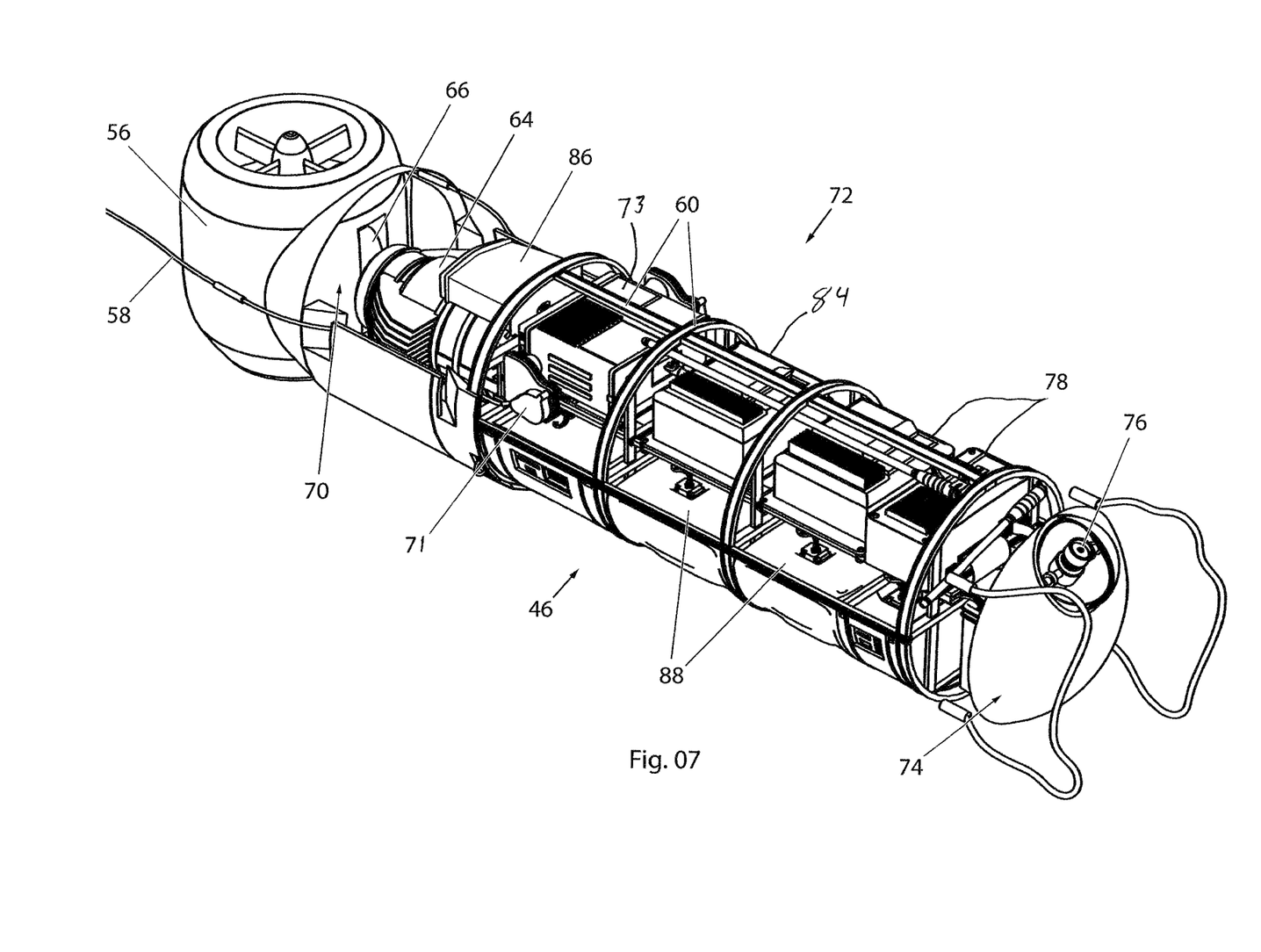
FIG. 7 is an illustration of a UAV module of the instant invention shown with a cover thereof removed or cut away.

FIG. 7 illustrates, by way of example, one possible layout of internal components of a power and control module 46. A primary structural support 60 forms a sub-frame that is designed to fit within exterior body 62 starting below fan motor 64 that powers ducted fan 56, as by a 90 degree gear box, a flexible shaft, belt or other drive mechanism. In the disclosed embodiment, an impeller blade 66 is mounted to a drive shaft of fan motor 64, and serves to provide a cooling airflow through module 46. Such cooling air is drawn into the module via Inlets 68 at the end of the module opposite from fan 56, and drawn up through the module and exhausted via vents 70 near fan 56. This airflow cools all the interior components in module 46.

The parachute is controlled by two enclosed pulley assemblies 71 (only one shown) located just below and on opposite sides of fan 56, with each pulley assembly 71 attached to a respective control line 58. The pulleys are operated by a servo motor or stepping motor 73 having a shaft (not shown) that extends from both sides of motor 73 to fixedly engage a respective pulley 71. There are several turns of control line 58 around each pulley 71, and control lines 58 are wrapped around the pulleys in opposite directions so that when the shaft of motor 73 is rotated, a control line 58 on one side is drawn in and the control line 58 on the other side is let out. As earlier noted, pulling and letting out the control lines 58 distorts a portion of parachute 44, causing the parachute to turn in the direction of the pulled control line.

Below motor 64 is a payload section 72, and within which components making up any desirable payload may be fitted. In the disclosed embodiment, which as noted is by way of example only, components for using the UAV as an aerial surveillance vehicle are mounted. Here, a camera pod assembly 74, within which a camera 76 is mounted, is oriented so as to look generally forward and downward from a lower end of module 46. In some embodiments, the camera assembly may be fitted with miniaturized pan controls, tilt controls, or both, so that the camera aiming direction is independent of flight direction of the parachute. In addition, the camera dome assembly may be provided on a back surface thereof with a protruding threaded male mounting base (not shown) that is centrally located on the back surface of the camera dome, and which threadably engages a threaded female receptacle (also not shown) that may be axially centered on the end of power and control module 46. This allows the cameras and dome assemblies to be removed and replaced simply by unscrewing the camera dome from the module and replacing it with another camera dome, which is simply screwed onto the module. Wires for powering the camera, transmitting video and activating pan and tilt mechanisms (where used) may be connected and disconnected using suitable plugs, and tucked up into the module through openings. This allows a wide range of cameras to be used, such as night vision cameras, infra-red cameras, and cameras with different fields of view and telescopic powers. Such cameras are widely available, are miniaturized and in some instances weigh only a few grams. It is also noted that some of the digital cameras are commercially available with radios for connecting to the Internet, with ranges of 500 feet to 1000 feet or so. In these instances, video from a UAV camera may be applied to the Internet and directed as desired or where needed.

Within module 46, at least a transmitter 78 and associated antenna is provided, and transmits video from the camera to a hand-held controller including a viewing screen, as will be further explained. The camera and associated transmitter are powered by a battery, such as one of batteries 88 that powers the UAV, or a dedicated battery.

A wire landing gear 82 is used to protect module 46 and camera pod 74 during landings in the instance where the module is to be reused.

A flight control radio and associated antenna 84, along with a microcontroller or other flight control circuitry receives flight commands from a hand-held controller. Such a radio transmitter/receiver pair may be the same as or similar to those found in the radio controlled model aircraft arts. The commands, which may be transmitted on separate channels like radio controlled model aircraft commands, are used to instruct motor 73 to turn in one direction or the other, in turn pulling and releasing the parachute control lines in one direction or the other as described, which corresponds to changing respective directions of the UAV. A motor speed controller integrated in control circuitry 84, in turn responsive to radio commands by the user, controls rotational speed of ducted fan 56, which in some embodiments may control altitude of the parachute/module assembly. Here, where the fan does not tilt as described above, altitude of the UAV will generally depend on the fan speed, with a faster fan speed causing the UAV to gain altitude, and a slower fan speed causing the UAV to maintain altitude or descend. Battery packs 88 power at least the fan and flight control circuitry, and may also power other components, such as the camera.

Figure 10:
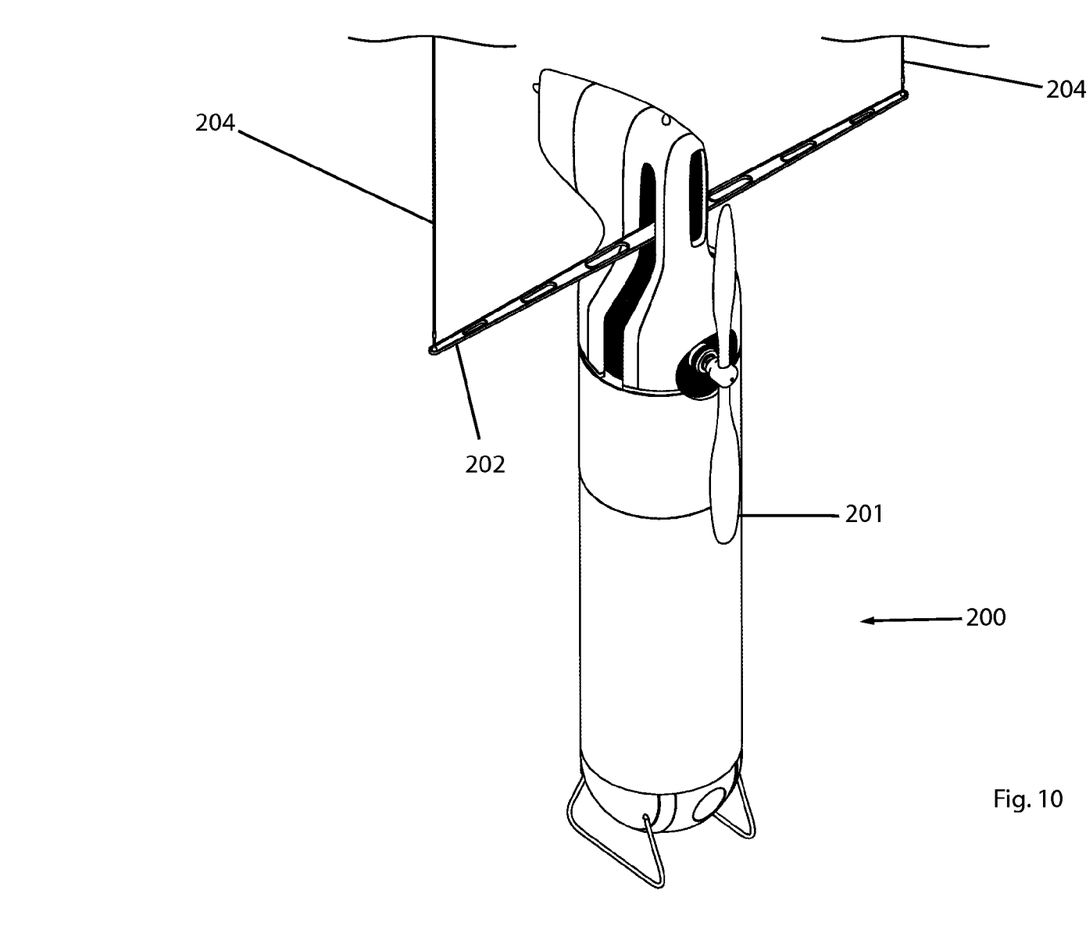
FIG. 10 is an illustration of another embodiment of a UAV module of the instant invention.

FIG. 10 illustrates another embodiment of a power and control module 200, and which also weighs about two to three pounds or so, and which may use the same parafoil or ram air parachute as described above. In this embodiment, the UAV is powered by a propeller 201 attached directly to a motor instead of a ducted fan, and thus may be somewhat more efficient and slightly lighter in weight. Another feature of this embodiment is that the control lines 204 attached to the parachute, such as parachute 44 (FIG. 6) are attached to respective ends of a rocker arm 202 that pivots from a pivot point at a center thereof. With this construction, module 200 is suspended by the pivot point at the center of arm 202. The position of arm 202 is responsive to radio flight commands as described above, and may be actuated by a linear actuator having an actuator arm or rod attached to rocker arm 202 on one side or the other of the pivot point of the rocker in order to move the one side of the rocker up and down, with the other side moving in opposite directions in order to pull or let out the respective parachute control lines. This arrangement would be the same as or very similar to actuator 61 and linkage 59 connected as shown in FIG. 6a, except linkage 59 would be connected to rocker arm 202 near the pivot point at the center of arm 202. In other embodiments, a rotary servo or stepper motor in module 200 and attached to a shaft fixed to arm 202 about which arm 202 pivots may be used to operate arm 202 and thus the control lines, or a stepper motor or servo motor mounted in module 200 and having an arm generally perpendicular to the driven shaft thereof may be connected to a linkage that rocks arm 202 up and pulls it down, thus manipulating the control lines.

Rocker arm 202 may have a total length of about 12 inches to 18 inches or so, and be of a folding construction so as to fit into canister 28. Here, a hinge (not shown) may be provided on each side of arm 202 near where the arm protrudes from a body of module 200, and outboard of where an actuator linkage for pivoting arm 202 is connected. These hinges would allow the protruding portions of arm 202 to be folded downward alongside the body of module 200. The hinges would be locking or limited range hinges configured with a catch or latch so that each hinged arm could not extend upward further than a position generally perpendicular to a vertical body of module 200. When deployed, the parachute would open and the weight of module 200 applied to the control lines 204 of the inflating parachute would pull the folded arms outward into the position shown in FIG. 10, with the catch on the hinge and weight of the module maintaining such unfolded position.

In yet another embodiment of a UAV of the instant invention, provisions may be made to tether the UAV to a ship. In this embodiment, the UAV is attached to a ship via a line, with speed of the ship causing sufficient airflow through the parachute to cause an unpowered UAV to remain aloft. Since direction of the UAV is controllable, it can be maneuvered to stay in a fixed position relative to the ship so that when the ship changes direction, the UAV can be directed to a position directly behind the ship. Such an embodiment can be scaled in size to carry electronic jamming equipment, sonobuoys that are dropped for detecting submarines or other equipment of interest. Significantly, such a tethered UAV can also be provided with the capability to release itself on command and fly or be flown to perform tasks the UAV is fitted for.

Figure 08:
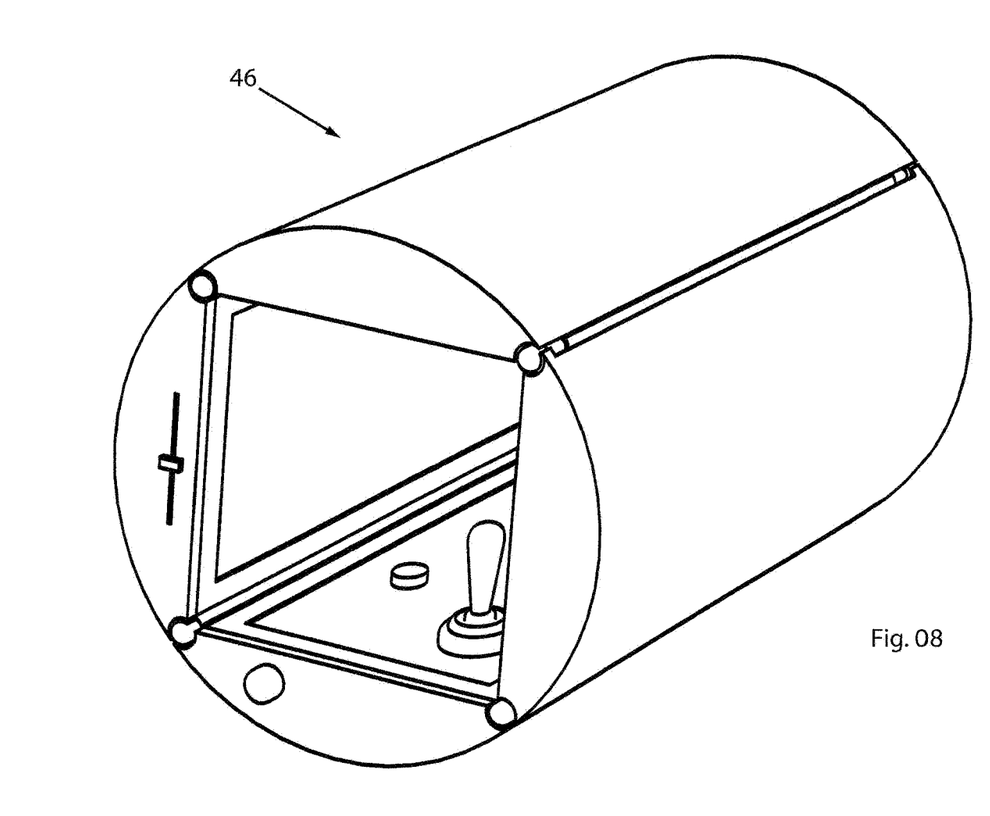
FIG. 8 is an illustration of a folded handheld controller of the instant invention.

As described, a hand controller 42 (FIGS. 8, 9) is used to control operation of the parachute/module assembly after it is deployed. Here, and as earlier noted, controller 42 is designed to be carried within housing 12 (FIG. 1) in a folded state that may generally conform to the inner diameter of housing 12, as shown in FIG. 8. As such, before projectile 13 is launched, controller 42 is removed from housing 12, or as noted, controller 42 may be stored in cap 14 and removed from the cap after cap 14 is removed from tube 12. This would prevent launch of projectile 13 with the controller still in housing 12.

Figure 09:
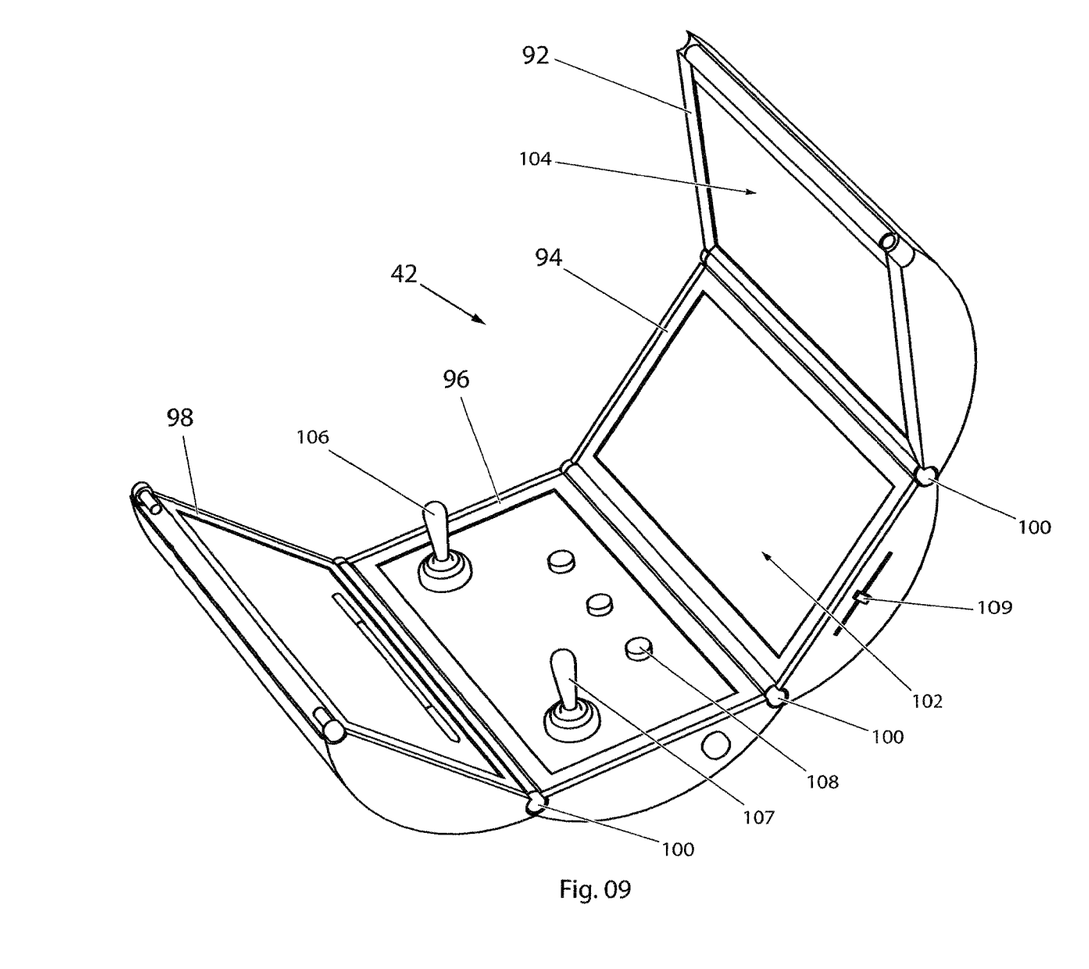
FIG. 9 is an illustration of the handheld controller of the instant invention shown opened and ready for use.

FIG. 9 illustrates, by way of example, one possible configuration of hand controller 42. The hand controller may include four housing assemblies 92, 94, 96 and 98 that are attached together with pins 100 that run through respective openings in edges of the assemblies, the pins 100 and openings serving to hingably connect the housing assemblies together so that the hand controller may be folded for storage as shown in FIG. 8, and unfolded for use as shown in FIG. 9.

Assembly 92 may be an Icon touch screen assembly from which icons are selected, and which may cause short automated radio bursts to be emitted, either from the UAV or from controller 42, that signal certain conditions to a central location or command center. For instance, in military applications, one icon may signal that a unit is under attack. Another icon may signal the need for a medical evacuation helicopter. A third icon may signal the need for artillery fire or an airstrike, and that fire control coordinates will follow shortly. In law enforcement embodiments, such icons may signal a type of crime, a need for backup, a signal to begin remote recording of a video stream or other such signals.

Assembly 94 may be a command and control video touchscreen assembly having a touch screen 102 that displays video from a camera in camera pod 76, and in some instances may be used to control flight direction by simply touching a point on the screen. Here, a microcontroller in controller 42 may utilize sensed X and Y coordinates on the touch screen where it is touched and convert the sensed coordinates from the touchscreen to directional commands sent to the UAV referenced to direction of flight of the UAV. Where the camera on the UAV is fixed, a heading of the UAV may be marked on the touchscreen with a rectangle, circle, a cross (+) or any other indica for identifying the heading. As such, touching any point on screen 102 will cause the fan (or propeller) speed and control lines on the parachute to be manipulated so as to direct the UAV toward the touched point on screen 102. In embodiments where the camera may be panned and tilted, a heading Indica may be electronically generated in the video, as by using onboard GPS to determine such heading. In other embodiments, screen 102 may simply be a video screen, with flight controls provided on assembly 96. In this instance, a toggle 106 may be operated to provide left/right commands, with fan power, and thus altitude, controlled by a slider 109. A second toggle 107 may be provided to cause pan and tilting of a surveillance camera. A button 108 may be provided to activate or drop an explosive or other device on or from the UAV, and other buttons may be provided to electrically launch projectile 13 from tube 12 by radio command. Other controls may be provided as needed, such as a tilt control for the ducted fan that would operate in the same manner as a tilt controller for a camera.

Assembly 98 may contain a battery for operating the hand controller, a radio transmitter for transmitting commands to the UAV and a video receiver for receiving a video stream from the camera mounted to the UAV. In some embodiments, such as those used in border control, a memory card slot (not shown) may be provided for inserting a memory card, such as an SD format memory card or the like, for recording the video stream. As noted above, a radio transmitter for the hand held controller would be the same as or similar to that used in the radio controlled model aircraft arts.

Electronic operation of the UAV, as described, would typically be accomplished through the use of microcontrollers and microprocessors. As noted above, when projectile 13 is launched, a switch on projectile 13 is operated, which initiates a timer to begin counting to a predetermined time delay corresponding to an altitude at which the UAV is released by releasing a catch on canister halves 30 and 32. In some instances, this switch can be used to activate and initialize the electronic components within the UAV, such as the camera and flight control system. In other instances, these components can be activated by a microswitch on module 46 when module 46 is released from canister 28. The hand held controller can be activated by a switch responsive to unfolding of the controller, or removal from housing 12 or cap 14.

In some embodiments, and as noted, an option may be provided for electronic launch of projectile 13. Here, housing 12 may be held in place by a person or positioned upright and unattended, such as simply being propped and braced against an object and with no overhead obstructions, or mounted vertically to a mobile robotic platform, and moved into position for launching. In order to launch, a launch button on the hand-held controller would be pressed. A safety button may be provided on the controller so that a user would need to press both the safety button and the launch button in order to launch projectile 13.

In other embodiments, a GPS receiver may be provided in the module of a UAV in order to determine coordinates of an observed target or object on the ground. In this instance, the position and altitude of the UAV would be determined using the onboard GPS receiver. With a known camera angle, either determined from a tilt mechanism or taken from a fixed camera angle, a simple triangulation calculation can determine coordinates of a target or object on the ground.

Having thus described my invention and the manner of its use, it should be apparent to those skilled in the relevant arts that incidental changes may be made thereto that fairly fall within the scope of the following appended claims, wherein I claim:

1. An unmanned aerial reconnaissance vehicle (UAV) system comprising:
    a parachute having a plurality of control lines comprising at least one first control line attached to one portion of said parachute and at least one second control line attached to another portion of said parachute, said parachute configured to be steered by simultaneous vertical movement of said at least one first control line and said at least one second control line,
    a power and control module of an elongated, generally cylindrical configuration suspended in a vertical orientation below said parachute, said power and control module further comprising:
        a propulsion device mounted at an upper portion of said power and control module, enabling said UAV to gain altitude, maintain altitude and to horizontally reposition said UAV following launch of said UAV,
    a signal receiver in said power and control module,
    a control mechanism attached to said at least one first control line and said at least one second control line, said control mechanism responsive to signals received by said signal receiver to move said at least one first control line and said at least one second control line in said simultaneous vertical movement, for controlling direction of said parachute, and
    a remote controller that transmits said signals to a flying said UAV.

2. A UAV system as set forth in claim 1 wherein said power and control module is suspended in said vertical orientation by said at least one first control line and said at least one second control line, said first control line and said second control line coupled to said upper portion of said power and control module.

3. A UAV system as set forth in claim 1 wherein said at least one first control line and said at least one second control line are attached to said control mechanism, said control mechanism located below said propulsion device.

4. A UAV system as set forth in claim 3 wherein said propulsion device is a ducted fan driven by a motor.

5. A UAV system as set forth in claim 2 wherein said control mechanism is at said upper portion of said power and control module, with said at least one first control line and said at least one second control line attached to said control mechanism at said upper portion of said power and control module.

6. A UAV system as set forth in claim 4 wherein said ducted fan is mounted for pivoting about a horizontal axis, with an actuator responsive to said signals received by said signal receiver, said actuator connected to controllably pivot said ducted fan in vertical directions, thereby controlling altitude of said UAV.

7. A UAV system as set forth in claim 5 wherein said control mechanism further comprises a single control element operated by said control mechanism, said at least one first control line and said at least one second control line attached to said single control element, said single control element operable by said control mechanism to move said at least one first control line and said at least one second control line in said simultaneous vertical movement.

8. A UAV system as set forth in claim 7 wherein said control mechanism moves said at least one first control line and said at least one second control line simultaneously in opposite said vertical directions with respect to each other.

9. A UAV system as set forth in claim 8 wherein said at least one first control line is attached to said single control element on one side of said upper portion, and said at least one second control line is attached to said single control element on an opposite side of said upper portion.

10. A UAV system as set forth in claim 9 wherein said single control element further comprises a first end on said one side of said power and control module and a second end on said opposite side of said power and control module, with said first control line attached to said first end of said single control element and said second control line attached to said second end of said single control element.

11. A UAV system as set forth in claim 10 wherein said single control element is a shaft rotated by said control mechanism, with a first pulley attached to said first end at said one side of said upper portion and a second pulley attached to said second end at said opposite side of said upper portion, with said first control line wound in one direction around said first pulley and said second control line wound in an opposite direction around said second pulley, so that rotation of said shaft develops said simultaneous vertical movement of said at least one first control line and said at least one second control line in said opposite vertical directions with respect to each other, thereby controllably steering said parachute.

12. An unmanned aerial reconnaissance vehicle (UAV) system comprising:
    a parachute,
    a first control line attached to one portion of said parachute and a second control line attached to another portion of said parachute, said parachute steered by simultaneous vertical movement of said first control line and said second control line, an elongated, generally cylindrical power and control module suspended in a vertical orientation below said parachute, said power and control module further comprising:
  a propulsion device mounted at an upper portion of said control module enabling said UAV to gain altitude, maintain altitude and to horizontally reposition said UAV following launch of said UAV,
  a signal receiver,
  a single control mechanism in said upper portion of said power and control module, and responsive to signals from said signal receiver, said single control mechanism attached to said first control line and said second control line, for moving said first control line and said second control line control lines in said simultaneous vertical movement, and
a remote controller that transmits said signals to a flying said UAV.

13. A UAV system as set forth in claim 12 wherein said single control mechanism operates to move said first control line and said second control line simultaneously in opposite vertical directions with respect to each other.

14. A UAV system as set forth in claim 13 wherein said first control line is attached to said single control mechanism on one side of said upper portion, and said second control line is attached to said single control mechanism on an opposite side of said upper portion.

15. A UAV system as set forth in claim 14 wherein said propulsion device is mounted at said upper portion of said power and control module.

16. A UAV system as set forth in claim 15 further comprising a camera mounted at a lower end of said power and control module.

17. A UAV system as set forth in claim 16 wherein said propulsion device further comprises a powered airfoil.

18. A UAV system as set forth in claim 17 wherein power applied to said powered airfoil determines altitude of said UAV.

19. A UV system as set forth in claim 12 wherein a ratio between a surface area of said parachute and weight of said power and control module is approximately 36 square inches of parachute for each ounce of said control module.

* * * * *